July 30, 1929.  J. BUDAY ET AL  1,722,730
MOTOR DRIVEN LAWN MOWER
Filed Jan. 3, 1927    2 Sheets-Sheet 2

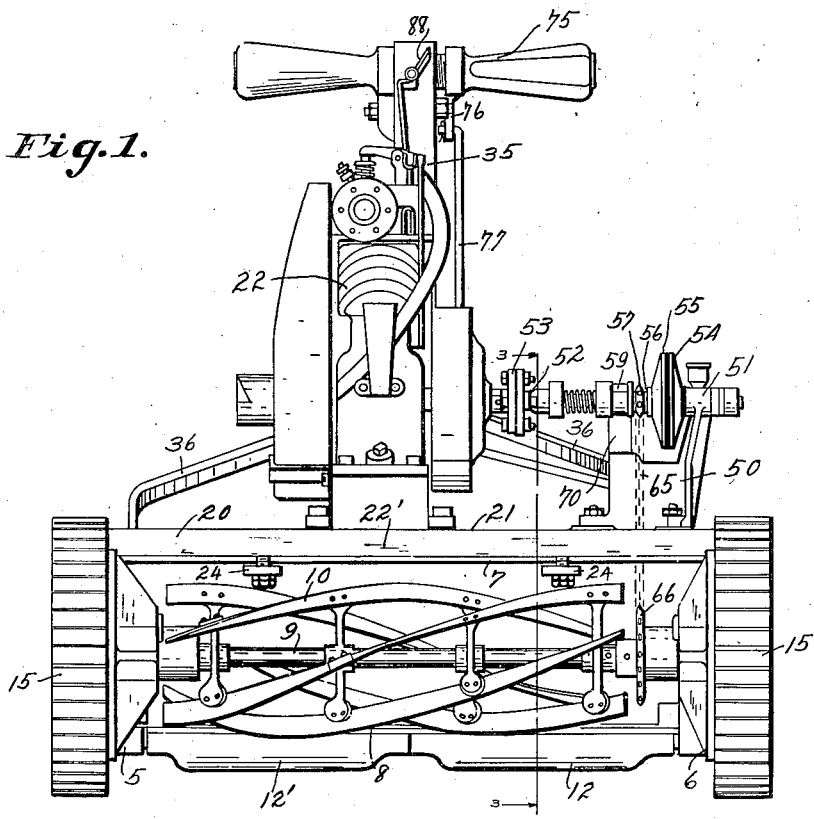

INVENTOR.
John Buday
William J. Meyer
BY
Erwin, Wheeler & Boolard
ATTORNEY.

Patented July 30, 1929.

1,722,730

UNITED STATES PATENT OFFICE.

JOHN BUDAY AND WILLIAM J. MEYER, OF MILWAUKEE, WISCONSIN, ASSIGNORS, BY MESNE ASSIGNMENTS, TO MODERN MACHINE WORKS, INC., A CORPORATION OF WISCONSIN.

MOTOR-DRIVEN LAWN MOWER.

Application filed January 3, 1927. Serial No. 158,547.

This invention relates to improvements in motor driven lawn mowers.

It is the object of the invention to provide a simple and compactly organized mechanism for the power actuation of a lawn mower of generally standard construction. The invention has particular reference to a novel and improved mounting for the engine and clutch assembly, to a novel and improved roller assembly which facilitates the operation of the device, to a novel and improved set of controls for the engine and clutch, and to a novel and improved handle mounting which relieves the operator of strain.

In the drawings:

Figure 1 is a front elevation of a lawn mower embodying this invention.

Figure 2 is a side elevation thereof with a part of the bull wheel removed.

Like parts are identified by the same reference characters throughout the several views.

Figure 3:
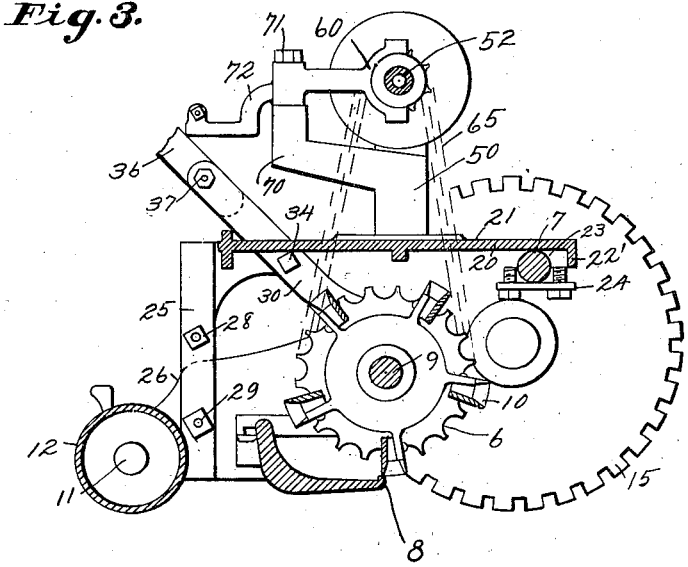
Figure 3 is a detail view taken on the section indicated on line 3—3 of Figure 1.

The frame of the lawn mower is of usual construction including the end pieces 5 and 6 connected together at the top by tie rod 7 and at the bottom by the cutter bar 8. The space between the end frames is spanned in the usual way by the shaft 9 carrying the reel 10 and by an additional shaft 11 for the roller 12.

In accordance with this invention the roller is not continuous across the space between the end frames of the mower but is made in at least two parts 12 and 12' as is clearly shown in Figure 1. The roller sections being independently journaled on shaft 11, may rotate at differing speeds as the lawn mower is turned and I have found that thereby the ease of operation of the mower is greatly increased. In furtherance of this object the rollers are tapered at their ends so that while they contact with the ground throughout the major portion of their length, they are still spaced from each other at the center to permit of a freedom of differential movement which would not otherwise be possible. Their shape is such as to make them interchangeable.

The lawn mower frame is primarily supported by the bull wheels or driving wheels 15 which may be provided with the usual internal gearing for power connection with pinions 16, one of which is shown in Figure 2. Pinion 16 is internally constructed in the usual way to provide an overrunning clutch of any desired type which is not necessary to show here, since such clutches involving the use of diametrically reciprocable dogs are in common and almost universal use in lawn mowers. In accordance with the present invention the pinions of the lawn mowers are interchanged so that the clutches work oppositely to the direction in which they operate in a hand mower. Thus the reel shaft 9 becomes the driving instead of the driven member and transmits power from pinion 16 to the bull wheel 15. This arrangement also is well known.

In order to mount the engine and clutch assembly upon the frame of an otherwise standard mower a specially designed platform bracket is supplied at 20. This bracket has a horizontal surface at 21 to which a small internal combustion engine 22 of any approved commercial type is bolted. The bracket rests at its forward end upon the tie bar 7, as best shown in Figure 3. A downwardly projecting flange 22' is notched at 23 to engage the tie bar, and a clamping plate 24 is bolted thereto from beneath to connect the bracket rigidly to the tie bar.

The rear margin of the platform 20 is supported from the lawn mower frame by legs 25 which rest upon the rearwardly extending portion 26 of each of the end pieces 5 and 6 in the manner best shown in Figures 2 and 3. Clips 27 are bolted at 28 to each leg 25 and are bolted at 29 to each end member 5 and 6 of the lawn mower frame whereby to secure the platform bracket 20 rigidly to the frame at the rear.

Additional anchorage for the platform is provided by arms 30 which are mounted on the handle studs 32 with which the mower is initially provided. It will be understood that the handle is ordinarily pivoted to the lawn mower frame upon studs 32 in the case of a hand operated mower, but when the platform bracket 20 is added to the mower it becomes impracticable to pivot the handle beneath such bracket and accordingly the arms 30 are used to provide new pivot points at the rear. In addition to being connected to the lawn mower frame at 32 each arm 30 is also bolted at 34 to the platform bracket and hence assists in rigidifying the assembly of such bracket upon the lawn mower.

The handle 35 is provided with the usual divergent arms 36 which, instead of being fulcrumed to the frame are pivoted to the complementary arms 30 at 37. The position of the handle about its fulcrumed connection at 37 with the rigid arms 30 is yieldably determined by means of a set of compression springs 38 and 39 mounted upon a bolt 40 carried by a special bracket 41 attached to platform bracket 20. Spring 38 is preferably heavier than spring 39 in order to carry the weight of handle 35 and the arrangement is such that the handle receives only a very small fraction of the vibration caused by the operation of the machine and of the engine, although the pivot bolts 37 transmit all lateral movements to the machine for steering purposes.

Power is transmitted from the engine to the reel shaft 9 and thence to the bull wheel through clutch mechanism which will now be described.

A standard 50 is bolted to the platform bracket 20 and provides a bearing at 51 for a power shaft 52 coupled at 53 to the crank shaft of the engine 22. A relatively non-adjustable clutch element 54 is made fast to the power shaft 52. A complementary clutch element 55 is rotatable on shaft 52 and is mounted on a sleeve 56 which is slidable thereon in an axial direction. This sleeve also carries a sprocket 57 and is channeled at 58 to receive the fingers 59 of a shifting fork 60. The pressure of a spring 61 seated against a collar 62 fixed by a pin 63 to the power shaft 52 is transmitted through a thrust bearing 64 to the sleeve 56 in a direction tending to maintain clutch elements 54 and 55 in face contact for the transmission of power from member 54 through member 55 to pinion 57. Sprocket pinion 57 is connected by a chain 65 with a driven sprocket 66 fixed to the reel shaft 9 as shown in Figure 1.

The actuating connections for the clutch will now be described.

The bracket 50 which supports the clutch bearing 51 has an arm 70 which projects rearwardly as best shown in Figure 3, and carries a fulcrum bolt 71 for the lever 72 upon which shifting fork 60 is mounted. Motion is transmitted to this lever to actuate the clutch shifting fork from a rotatable handle grip 75 on handle 35 by means of an arm 76 carried by such grip, a link 77 pivoted to said arm, a bell crank 78 fulcrumed to handle 35 at 79, and to which said link 77 is pivoted at 80, and a link 81 pivoted to the bell crank at 82 and adjustably bearing against the clutch shifting lever 72 by means of nuts 83 which bear against said lever adjacent an aperture through which link 81 extends.

Figure 4:
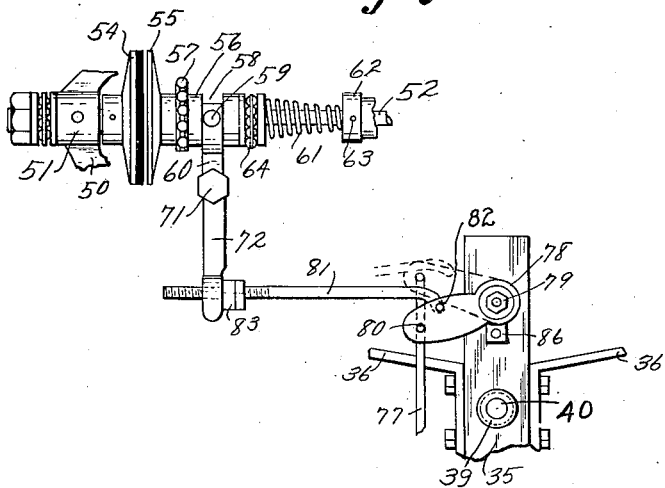
Figure 4 is a developed view in plan of a portion of the clutch actuating connection.

Only a very slight movement of clutch element 55 between positions for engagement or for disengagement is necessary. This movement is provided for when the bell crank 78 is thrown across center from its full line position, in Figure 4, to the position in which it is shown in dotted lines in said figure. The dotted line showing represents the bell crank in a position which it occupies when the clutch is engaged under the pressure of spring 61. It will be noted that with the bell crank in this position the thrust of the spring tends to rotate the bell crank in a clockwise direction as viewed in Figure 4. The extent of movement in this direction is limited by a suitable stop 85 on handle 35 with which the arm 76 engages. The adjustment of the parts is such that when arm 76 encounters stop 85, an operative driving connection will be established through the clutch from power shaft 52 to the lawn mower reel shaft and thence to the wheels.

When the handle grip 75 is rotated counter-clockwise, as viewed in Figure 2, toward clutch disengaging position, the initial movement thereof is opposed by spring 61 which is subjected to additional compression. As the bell crank 78 swings across center, however, spring 61 is permitted to expand and tends to oscillate the bell crank in a counter-clockwise direction toward the stop 86 which it ultimately abuts to hold the parts in a position in which the clutch is disengaged. By virtue of this construction it will be apparent that the clutch spring itself so co-operates with the actuating connections for the clutch in as to maintain such connections yieldably in either of their extreme positions, no additional springs being necessary for this desired purpose.

Engine operation may be controlled either by rendering the other handle grip rotatable or by leaving such other grip fixed as shown, and by supplying a small hand lever 88 adjacent thereto. Both constructions are known in the art.

It will be apparent from the foregoing description that a lawn mower embodying this invention will be both simple and compact, and can readily be assembled upon a lawn mower frame of ordinary construction. The platform bracket provides a simple and convenient means of mounting unitarily the engine and clutch assembly. The connection with the handle with the mower is such as to eliminate the vibration which has heretofore been imparted to the hands of the operator. Steering is made easy by the divided roller at the rear. The actuating connections to the clutch are such that the clutch spring maintains them in either of their extreme positions of adjustment and eliminates rattling and the possibility of slippage. The objects of the invention are therefore fully satisfied.

We claim:

1. In a power lawn mower, the combination with a standard frame and mower assembly including end frame members and a tie bar extending therebetween, of a bracket platform adapted to support an engine from said frame and comprising means clamping said platform to said tie bar and downward extensions at the rear of said platform connected with rear portions of said end frame members.

2. The combination with a wheel supported lawn mower frame including end frame members and a tie bar extending between said members, of a bracket platform for a prime mover having a notched portion engaged upon said tie bar and a clamp cooperating therewith to maintain such engagement, together with depending legs resting upon the rearmost portions of said end frame members and means connecting said legs thereto.

3. The combination with a wheeled lawn mower including end frame members and means connecting said members, of a motor supporting bracket mounted upon said frame and a substitute handle support comprising arms fixed to said frame and to said bracket and provided with means beyond said bracket for the attachment of a handle thereto.

4. The combination with a wheeled lawn mower including end frame members and means connecting said members, of a motor supporting bracket mounted upon said frame and a substitute handle support comprising arms fixed to said frame and to said bracket and provided with means beyond said bracket for the attachment of a handle thereto, said arms being secured to said frame by means originally employed to receive said handle and being adapted for connection with the handle ordinarily secured to said frame by said last mentioned means, whereby said handle may be pivoted through said arms to said frame in a position in which its movement will not be restrained by said bracket.

5. The combination with a lawn mower assembly and a handle in pivotal connection therewith, of spring means connected with said assembly and yieldably acting upon said handle, whereby to maintain said handle in a given position of adjustment about said pivotal connection, said spring means including oppositely acting springs arranged to oppose the movement of said handle in either direction from said position.

6. The combination with a lawn mower assembly and a handle in pivotal connection therewith for swinging movement in a vertical plane, of an arm projecting from said assembly in substantial parallelism to the normal position of said handle and a set of compression springs connected with said arm and acting upon said handle from above and below, whereby yieldingly to fix said handle in said position.

7. The combination with a wheeled lawn mower adapted to be guided by a person on foot, of a handle in pivotal connection with said lawn mower for swinging movement in a vertical plane, a fixed arm connected with said handle, a spring guide upon said arm and spring means positioned by said guide and acting upon said handle in a direction tending to maintain it yieldingly in a given position of swinging movement about its pivotal connection with said lawn mower.

8. In a power driven lawn mower, the combination with a standard mower frame including end frame members having rearwardly projecting portions and a tie bar extending between said frame members, of a bracket platform adapted to support an engine and comprising clamping means engaging the tie bar and downwardly extending legs at the rear of the platform connected with the rearwardly projecting portions of the end frame members, a handle pivotally secured to said frame, an arm secured to the bracket platform and extending in substantial parallelism to the normal position of said handle, a spring guide carried by the arm and projecting across the handle, springs guided by the spring guide and disposed upon opposite sides of the handle, whereby vibrations generated by an engine on said platform will be substantially nullified by the spring before they reach said handle.

JOHN BUDAY.
WILLIAM J. MEYER.